Dec. 27, 1938.        H. C. TAYLOR        2,141,321
BRAKE BEAM SUPPORT
Filed Oct. 22, 1937
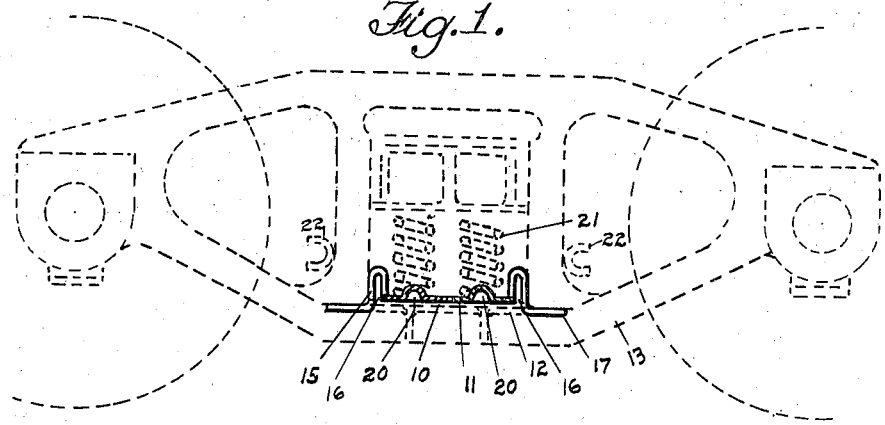
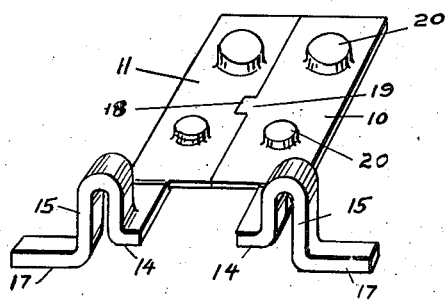
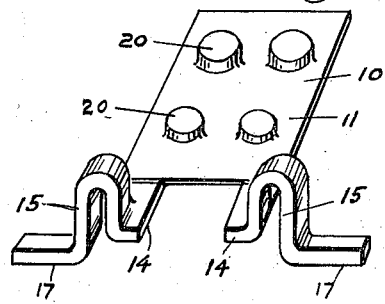
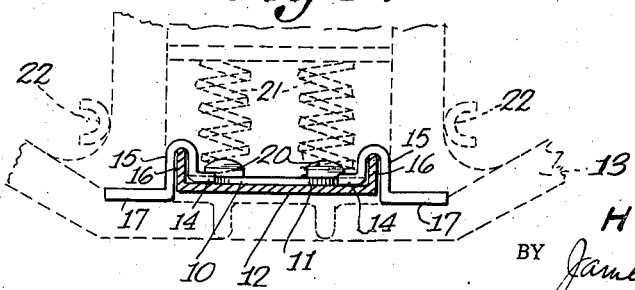
INVENTOR.
Harry C. Taylor
BY James R. McKnight
ATTORNEY.

Patented Dec. 27, 1938

2,141,321

UNITED STATES PATENT OFFICE 2,141,321

BRAKE BEAM SUPPORT

Harry C. Taylor, Hammond, Ind.

Application October 22, 1937, Serial No. 170,429

3 Claims. (Cl. 188—210)

My invention relates to safety mechanism in the form of a brake beam support particularly for use on railway cars.

Among the objects of my invention is to provide means for supporting the brake beams of a railway car if they should at any time become detached by accident, failure of parts or otherwise, so as to prevent them from dropping onto the rails and causing derailment and serious damage; to create a brake beam support held in position by car weight, thereby eliminating the use of extra attachment means such as bolts, rivets, hooks, cotter pins, welding and the like, thus eliminating excessive labor, and materials costs required for existing structures; to supply a brake beam support that will not become loosened and detached by vibration and thus fail in time of emergency as a safety device; to create a brake beam support simple and economical in construction, adaptation and use, efficient and reliable in operation, and such other objects, advantages and capabilities as will later more fully appear and which are inherently possessed by my invention.

While I have shown in the accompanying drawing a preferred embodiment of my invention, yet I wish it understood that the same is susceptible to modification and change without departing from the spirit of my invention.

Referring to the drawing, Fig. 1 is a sectional view through the truck structure of a railway car illustrating my brake beam support in connection therewith. Figs. 2 and 3 are detailed perspective views of slightly different embodiments of my brake beam support. Fig. 4 is a detail sectional view showing the spring plank and brake beam support in full lines.

The embodiment selected to illustrate my invention comprises a brake beam support 10, having a spring seat portion 11 adapted to lie on the spring plank 12 of a railway car truck 13. Projecting integrally from the spring seat 11 is an extension 14 which also lies on the spring plank at its upper surface. Substantially at a right angle to the extension 14 and integral therewith, my brake beam support is bent upwardly, outwardly and downwardly to form bent portion 15 adapted to fit over the flange 16 of the spring plank 12. My brake beam support then continues integrally outwardly to form a substantially horizontal supporting arm.

When my brake beam support is made of one piece of metal as shown in Fig. 2, there are of course two extensions 14 on opposite sides extending parallel from the spring seat portion 11, oppositely disposed bent portions 15 and oppositely extending horizontal supporting arms 17.

When my brake beam support is made of two pieces of metal as shown in Fig. 3, one of the spring seat portions 11 has a notch 18 at its inner edge to receive a projection 19 in the inner edge of the other spring seat member 11 so that the two may interlock. This prevents forward or backward movement of one spring seat member without the other.

My spring seat portion 11 may have a boss or bosses 20 to receive the ends of and retain in position the truck springs 21. With this structure, I eliminate the need of a separate spring seat heretofore used.

My brake beam support is made of metal. The spring seat portion or portions 11 may be made of comparatively thin metal—for purposes of illustration, one-fourth of an inch in thickness. The bent portions 15 and the supporting arms 17 are made of metal of increased thickness, strong enough to support the weight of a brake beam 22 and for purposes of illustration may be three-quarters of an inch thick and two inches wide. The dimensions and weights of all of these parts may of course be varied without departing from the spirit of my invention.

In use the spring seat portion of my brake beam support is placed on top of the spring plank of the truck of a railway car. The bent portion, shaped upwardly, outwardly and downwardly is adapted to fit over the particular flange of the spring plank over which it is positioned. The springs are set so that the ends fit over and around the bosses and thus positioned are held in place. The railway car is positioned of course on the bolsters of the truck, and the bolsters lie against the springs, so that the car weight exerts pressure on the springs and in turn on my brake beam support so as to hold it in position. It will therefore be noted that no rivets, bolts, or pins are necessary to attach my brake beam support to the spring plank.

Having thus described my invention, I claim:

1. A brake beam support for a railway car having a spring plank, comprising a body portion adapted to lie on said spring plank and be held in position by the weight of the car, and a substantially horizontal supporting arm, said body portion having means for positioning the ends of the springs of the railway car.

2. A brake beam support for a railway car having a spring plank comprising a body portion adapted to lie on said spring plank and be held in position by the weight of the car, and a pair of substantially horizontal supporting arms, said body portion having means for positioning the ends of the springs of the railway car.

3. A brake beam support for a railway car having a spring plank comprising a pair of spring seat portions adapted to fit together, said spring seat portions positioned on top of said spring plank and held in position by the weight of the car, each of said spring seat portions having a substantially horizontal supporting arm, and each of said spring seat portions having means for positioning the ends of the springs of the railway car.

HARRY C. TAYLOR.